(12) United States Patent
Hecht et al.

(10) Patent No.: US 12,468,388 B2
(45) Date of Patent: Nov. 11, 2025

(54) SYSTEM AND METHOD FOR EYE-GAZE DIRECTION-BASED PRE-TRAINING OF NEURAL NETWORKS

(71) Applicant: GM GLOBAL TECHNOLOGY OPERATIONS LLC, Detroit, MI (US)

(72) Inventors: Ron M. Hecht, Raanana (IL); Omer Tsimhoni, Bloomfield Hills, MI (US); Dan Levi, Ganei Tikvah (IL); Shaul Oron, Rehovot (IL); Andrea Forgacs, Kfar Sava (IL); Ohad Rahamim, Netanya (IL); Gershon Celniker, Netanya (IL)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 18/489,338

(22) Filed: Oct. 18, 2023

(65) Prior Publication Data
US 2024/0143074 A1 May 2, 2024

Related U.S. Application Data

(60) Provisional application No. 63/419,508, filed on Oct. 26, 2022.

(51) Int. Cl.
| | |
|---|---|
| G06F 3/01 | (2006.01) |
| G06T 7/50 | (2017.01) |
| G06V 10/74 | (2022.01) |

(52) U.S. Cl.
CPC ............... *G06F 3/013* (2013.01); *G06T 7/50* (2017.01); *G06V 10/761* (2022.01); *G06T 2207/20084* (2013.01); *G06T 2207/20228* (2013.01); *G06V 2201/07* (2022.01)

(58) Field of Classification Search
None
See application file for complete search history.

(56) References Cited

U.S. PATENT DOCUMENTS

2018/0204365 A1* 7/2018 Lee ........................... G06T 7/55

OTHER PUBLICATIONS

Hecht, Rahamin, Oron, Forgacs, Celniker, Levi, Tsimhoni; Gaze Pre-Train for Improving Disparity Estimation Networks; In: ICASSP 2023—2023 IEEE International Conference on Acoustics, Speech and Signal Processing (ICASSP). IEEE, 2023. S. 1-5.

* cited by examiner

*Primary Examiner* — Samira Monshi
(74) *Attorney, Agent, or Firm* — Quinn IP Law (57) ABSTRACT

A method of training a disparity estimation network. The method includes obtaining an eye-gaze dataset having first images with at least one gaze direction associated with each of the first images. A gaze prediction neural network is trained based on the eye-gaze dataset to develop a model trained to provide a gaze prediction for an external image. A depth database is obtained that includes second images having depth information associated with each of the second images. A disparity estimation neural network for object detection is trained based on an output from the gaze prediction neural network and an output from the depth database.

20 Claims, 5 Drawing Sheets

SYSTEM AND METHOD FOR EYE-GAZE DIRECTION-BASED PRE-TRAINING OF NEURAL NETWORKS

CROSS-REFERENCE TO RELATED APPLICATION

This application claims priority to U.S. Provisional Patent Application No. 63/419,508, filed on Oct. 26, 2022, and entitled "SYSTEM AND METHOD FOR EYE-GAZE DIRECTION BASED PRE-TRAINING OF NEURAL NETWORKS", the entirety of which are incorporated herein by reference.

INTRODUCTION

Vehicles are a staple of everyday life. Special use cameras, microcontrollers, laser technologies, and sensors may be used in many different applications in a vehicle. Cameras, microcontrollers, and sensors may be utilized in enhancing automated structures that offer state-of-the-art experience and services to the customers, for example in tasks such as body control, camera vision, information display, security, autonomous controls, etc. Vehicular vision systems may also be used to assist in vehicle control.

Vehicular vision systems may be used to provide the vehicle operator with information of the environment surrounding the vehicle. The vision systems may also be used to greatly reduce blind spot areas to the sides and rear of the vehicle. Vison systems may also be used to monitor the actions and movements of occupants, especially the vehicle operator. In particular, driver monitoring systems may include vision systems that may be used to track a vehicle operator's head and eye position and movement, e.g., eye gaze. Eye gaze may generally refer to the direction that a driver's eyes are fixated at any given instant. Such systems may detect an operator eye gaze and may be used in numerous useful applications including detecting driver distraction, drowsiness, situational awareness, and readiness to assume vehicle control from an automated driving mode for example.

SUMMARY

Disclosed herein is a method of training a disparity estimation network. The method includes obtaining an eye-gaze dataset having first images with at least one gaze direction associated with each of the first images. A gaze prediction neural network is trained based on the eye-gaze dataset to develop a model trained to provide a gaze prediction for an external image. A depth database is obtained that includes second images having depth information associated with each of the second images. A disparity estimation neural network for object detection is trained based on an output from the gaze prediction neural network and an output from the depth database.

Another aspect of the disclosure may be where the first images are captured by at least one optical sensor and the at least one gaze direction associated with each of the first images is captured by a gaze direction system configured to determine an eye gaze direction for at least one eye.

Another aspect of the disclosure may be where the second images is captured by the at least one optical sensor and the depth information associated with each of the second images is captured by a distance sensor configured to determine a distance between an object and the distance sensor.

Another aspect of the disclosure may be where training the gaze prediction neural network on the eye-gaze dataset includes performing a dilation on the at least one gaze direction.

Another aspect of the disclosure may be where the dilation corresponds to an area of focus of an eye.

Another aspect of the disclosure may be where training the gaze prediction neural network includes associating at least one eye gaze direction with a corresponding one of the first images.

Another aspect of the disclosure may be where the output from the depth database includes transforming the depth information into normalized disparity maps according to normalized disparity label.

Another aspect of the disclosure may be where the output from the depth database includes the second images.

Another aspect of the disclosure may be where a resolution of the normalized disparity matches a scaled version of a corresponding one of the second images.

Another aspect of the disclosure may be where training the disparity estimation neural network includes minimizing a least absolute deviation between a ground truth measurement and a prediction by the disparity estimation neural network.

Another aspect of the disclosure may include performing a back propagation when training the disparity estimation neural network to minimize the least absolute deviation.

Another aspect of the disclosure may be where the first images match the second images.

Disclosed herein is a non-transitory computer-readable storage medium embodying programmed instructions which, when executed by a processor, are operable for performing a method. The method includes obtaining an eye-gaze dataset having first images with at least one gaze direction associated with each of the first images. A gaze prediction neural network is trained based on the eye-gaze dataset to develop a model trained to provide a gaze prediction for an external image. A depth database is obtained that includes second images having depth information associated with each of the second images. A disparity estimation neural network for object detection is trained based on an output from the gaze prediction neural network and an output from the depth database.

Disclosed herein is a vehicle system. The system includes at least one optical sensor configured to capture images, at least one distance sensor configured to measure distances from the at least one distance sensor and an eye gaze measurement system configured to determine an eye position of a driver. The system also includes a controller in communication with the at least one optical sensor, the at least one distance sensor, and the eye gaze measurement system. The controller is configured to obtain an eye-gaze dataset including first images with at least one gaze direction associated with each of the first images and train a gaze prediction neural network based on the eye-gaze dataset to develop a model trained to provide a gaze prediction for an external image. The controller is also configured to obtain a depth database including second images having depth information associated with each of the second images and train a disparity estimation neural network for object detection based on an output from the gaze prediction neural network and an output from the depth database.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 1:
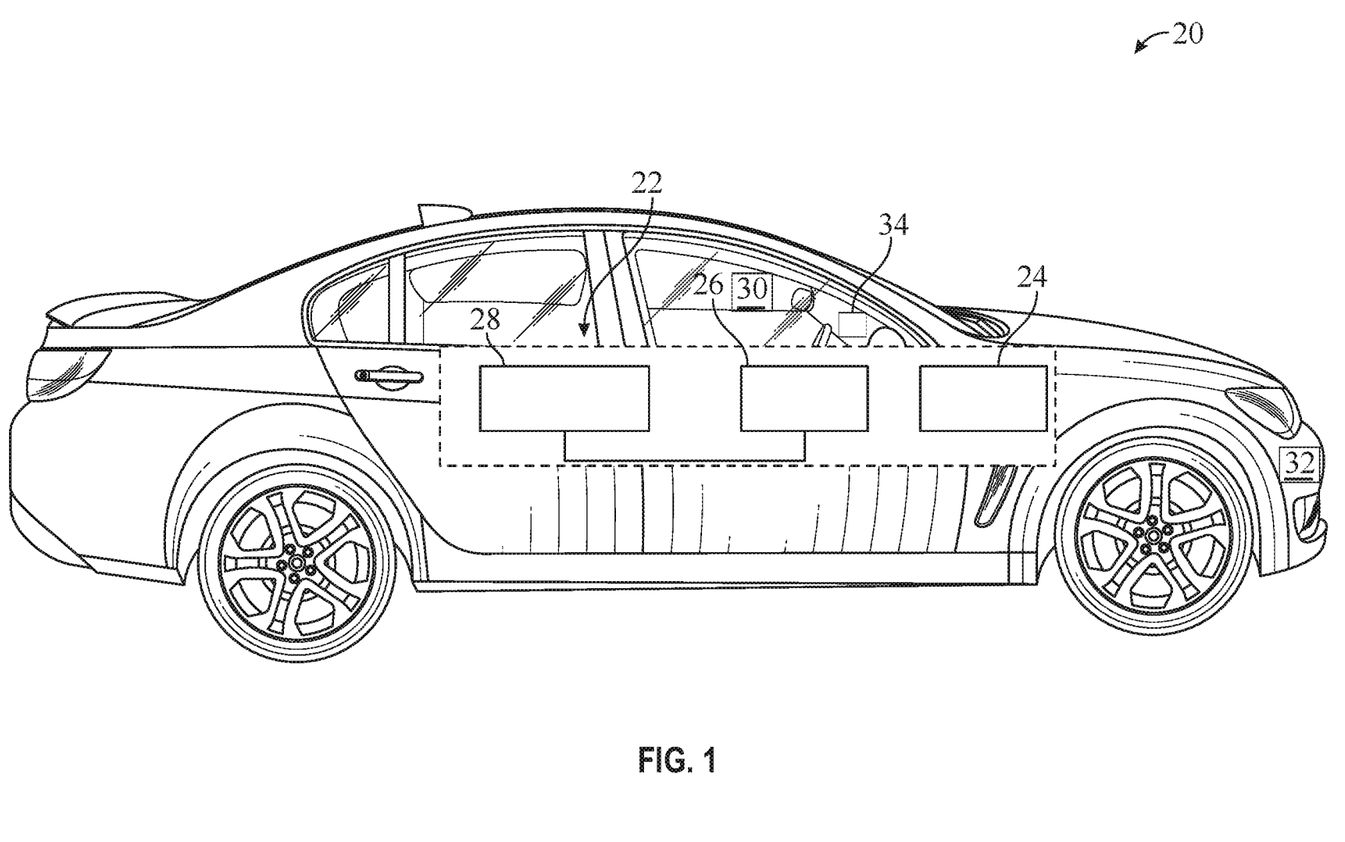
FIG. 1 illustrates an example vehicle incorporating a plurality of sensors.

In accordance with an exemplary embodiment, FIG. 1 shows a vehicle 20 that can be operated in an autonomous mode or automated mode. The vehicle 20 can be a fully autonomous vehicle or a semi-autonomous vehicle. The vehicle 20 includes a driving system 22 that controls autonomous operation of the vehicle. The driving system 22 includes a sensor system 24 for obtaining information about the surrounding or environment of the vehicle 20, and a controller 26 for computing possible actions for the autonomous vehicle based on the obtained information and for implementing one or more of the possible actions, and a human machine interface 28 for communicating with an occupant of the vehicle, such as a driver or passenger. The sensor system 24 can include at least one optical sensor 30, such as at least one camera, at least one distance sensor 32, such as a depth camera (RGB-D) or Lidar, and an eye-gaze monitoring system 34. In the illustrated example, the optical sensor 30 and the distance sensor 32 include at least partially overlapping fields of view in order to relate information captured by each of the sensors.

Figure 2:
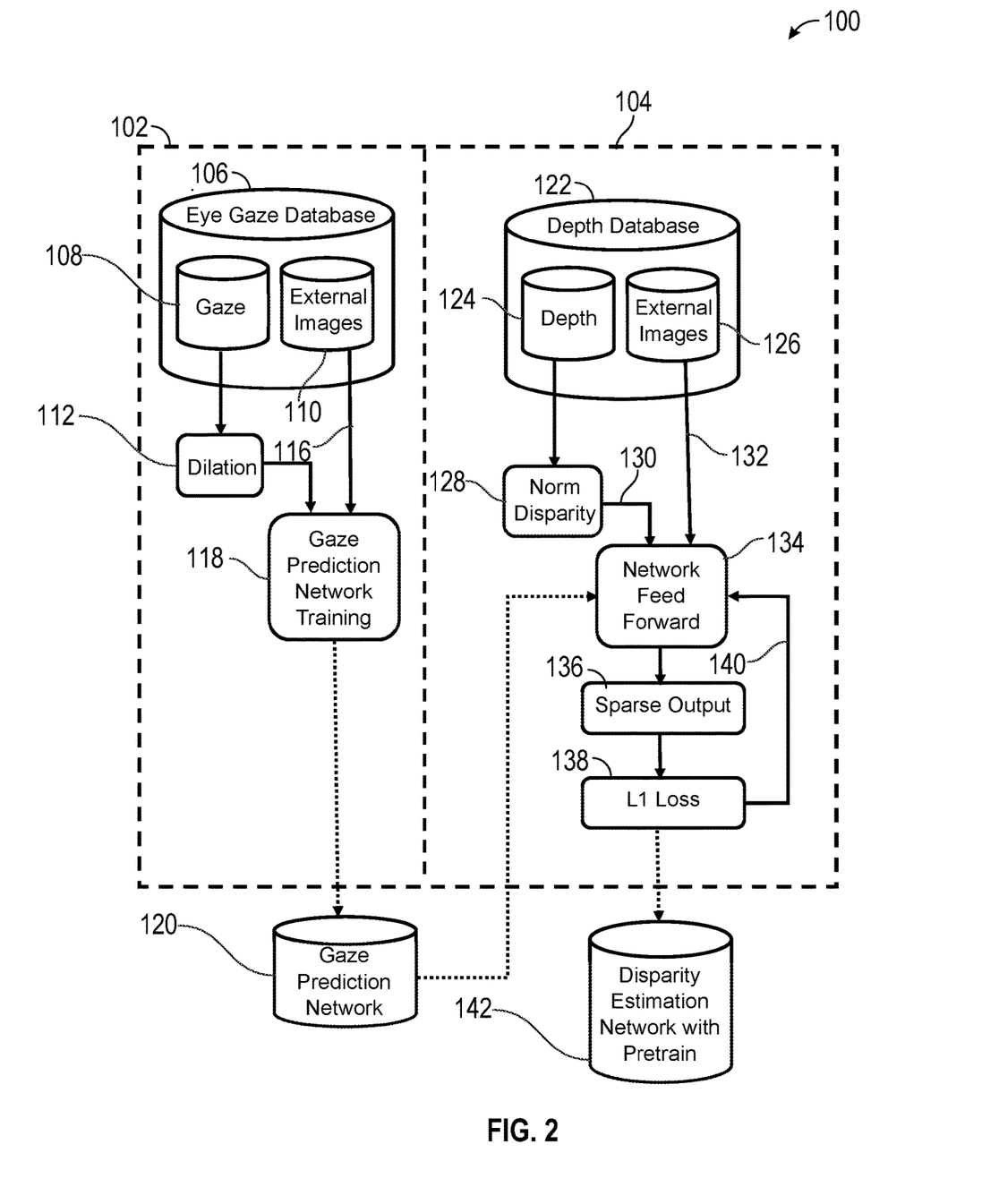
FIG. 2 schematically illustrates a method of developing a neural network for disparity estimation.

The controller 26 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 26 may include a non-transitory computer-readable medium that stores instructions which, when processed by one or more processors of the controller 26, implement a method 100 of developing a disparity estimation neural network, according to one or more embodiments detailed herein. The controller 26 can operate programs that perform artificial intelligence. However, this disclosure applies to decision-making systems that utilize or generate vectors, such as probability or confidence vectors, in the decision-making process.

In this disclosure, the method 100 (FIG. 2) of developing the neural network for object detection includes a pre-training phase (Block 102) and a training phase (Block 104). The pre-training phase at Block 102 is an at least partially unsupervised training process that uses automatically generated labels based on gaze data for real end-goal task inputs as will be described below. The pre-training phase precedes a supervised training phase, such as the training phase at Block 104, to provide an intuition and improve neural network performance by reducing training loss without performing manual labor-intensive labeling.

In the illustrated example, the pre-training phase (Block 102) includes an eye-gaze database (Block 106). The eye-gaze database includes a collection of external images 58 (FIG. 4A) at Block 110. The external images 58 can be captured by the optical sensor 30. In one example, the external images 58 captured while the vehicle 20 is driving are down scaled in resolution to 500×500 pixels to manage data size and are captured at a rate of 20 Hz by the optical sensor 30.

Figure 5:
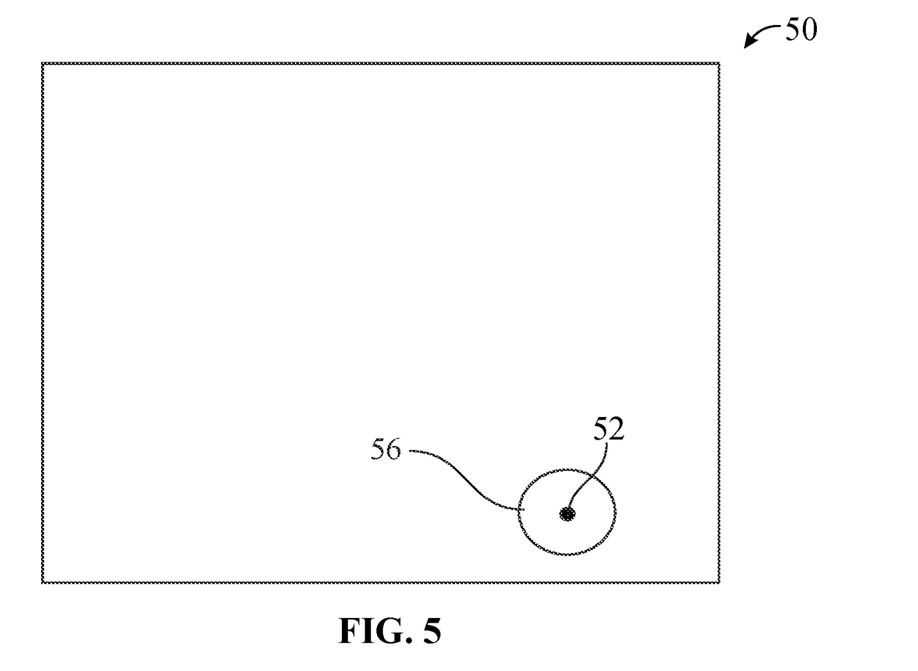
FIG. 5 illustrates an example eye-gaze image.

The eye-gaze database also includes information captured by the eye-gaze monitoring system 34 (Block 108). The information captured by eye-gaze monitoring system 34 can include a gaze direction 52 of the driver of the vehicle 20 recorded relative to an eye-gaze image 50 (FIG. 5). The gaze direction 52 can correspond to a single point in the eye-gaze image 50 or include a small region in the eye-gaze image 50. In one example, the eye-gaze monitoring system 34 includes at least one optical sensor that can determine a gaze direction for one or both of the driver's eyes. If the gaze direction for each of the driver's eyes is being measured, this information can also be used to estimate a distance from the vehicle that the driver is looking.

The eye-gaze image 50 can also include a resolution that matches the resolution of the external images 58. This allows the gaze direction 52 to map onto the external images 58 captured by the optical sensor 30. In one example, for each of the external images, the map over will include a corresponding x and y coordinates that associate the location of the gaze direction 52 to the external image 58.

The eye-gaze database can also include a time stamp for each of the eye-gaze images 50 with the gaze direction 52 captured in order to match the gaze direction 52 with a corresponding external image 58 captured by optical sensor 30. The gaze information is dense i.e., for every pixel in the eye-gaze image 50, there is a label indicating whether the driver was looking at that spot or not.

At Block 112, the gaze direction 52 of the driver is dilated to create a label 56 (FIG. 5) that corresponds to a region of interest, such as where the fovea of the eye might focus. A size and shape of the region of interest for the label 56 can vary to be more inclusive or less inclusive. Because the labels 56 are generated automatically, the pre-training at Block 102 does not require human intervention beyond capturing the gaze directions 52 of the driver while operating the vehicle 20. This can reduce the time needed for labeling images in a pre-training dataset for training a neural network and allow for a larger quantity of data to be used for pre-training purposes.

The method 100 sends the labels 56 and inputs 116, such as the external images 58, to Block 118 to train a gaze prediction neural network. The gaze prediction neural network matches the region of interest for the label 56 generated at Block 112 with at least one corresponding external image 58 from the collection of external images 116.

Alternatively, based on a data collection rate for the external images 58 and the gaze directions 52, each of the external images 58 may include more than one corresponding region of interest for the label 56. For example, the external images 58 could be captured at a rate of 20 Hz while the gaze directions 52 could be captured at a rate of 60 Hz. Therefore, each of the external images 58 could include up to three different corresponding labels 56 as determined from the gaze directions 52. However, it is possible that some of the eye-gaze images 50 could include labels 56 that overlap or no region of interest at all if the gaze direction 52 was not within the bounds of the eye-gaze image 50.

In one example at Block 118, an eye gaze corpus may be used to train a U-net. In one example, 200,000 batches may be digested during training. Each batch may include four pairs of external images 58 and the corresponding regions of interest for the 56. The training at Block 118 can then output a gaze prediction network at Block 120 that can be stored in memory in controller 26 or another location.

The gaze prediction network from Block 120 may then be used to generate a gaze prediction image 60 (FIG. 4B) that predicts for a given external image 58 if and where the label 56 would be. In the illustrated example, the gaze prediction image 60 includes regions with solid circles that correspond to a highest gaze prediction, areas with hollow circles indicating the next lower level of gaze prediction, blank space that indicate a neutral level of gaze prediction, and areas with X's that indicate the lowest level of gaze prediction. However, other scales can be used, such as color or gradient in accordance with this disclosure.

During the training phase (Block 104), the method 100 is directed to training a disparity estimation network (Block 142) utilizing depth information in connection with external images 58 and the gaze prediction network (Block 120) generated from the pre-training phase (Block 102). The gaze prediction network provides intuition when training the disparity estimation network.

The training phase at Block 104 includes a depth database at Block 122. The depth database includes depth information (Block 124) captured by the distance sensor 32 and external images (Block 126) captured by the optical sensor 30. The information in the depth database can be collected while the vehicle 20 is being manually driven by the driver.

The depth database includes depth information captured by the at distance sensor 32 at Block 124. In one example, the depth information is in the form of a depth map. The depth map is generated from several scans from the distance sensor 32. The depth map includes significantly less data relative to the eye-gaze image 50. This is due to the depth map including information for the areas where depth measurements were made.

At Block 128, the depth information is transformed to normalized disparity maps according to processes disclosed herein related to normalized disparity labels. The normalized disparity maps are used during this phase as Ground Truth (GT)/label at 130 for training to establish a normalized disparity estimation network (Block 142).

In parallel, the external images 58 are provided as inputs at 132 to a network feed forward at Block 134 with the GT/label 130. The external images 58 from Block 126 can also down scaled to an image resolution 500×500 pixels to improve data management and maintain a consistent pixel size for comparison.

The training phase (Block 104) aligns the external images 58 captured by the optical sensor 30 with depth information and a distance to different objects in the scene. The optical sensor 30 and the distance sensor 32 are aligned such that while one of the external images is taken by the optical sensor 30, several scans of the vehicle vicinity are being performed by the distance sensor 32.

Figure 3A:
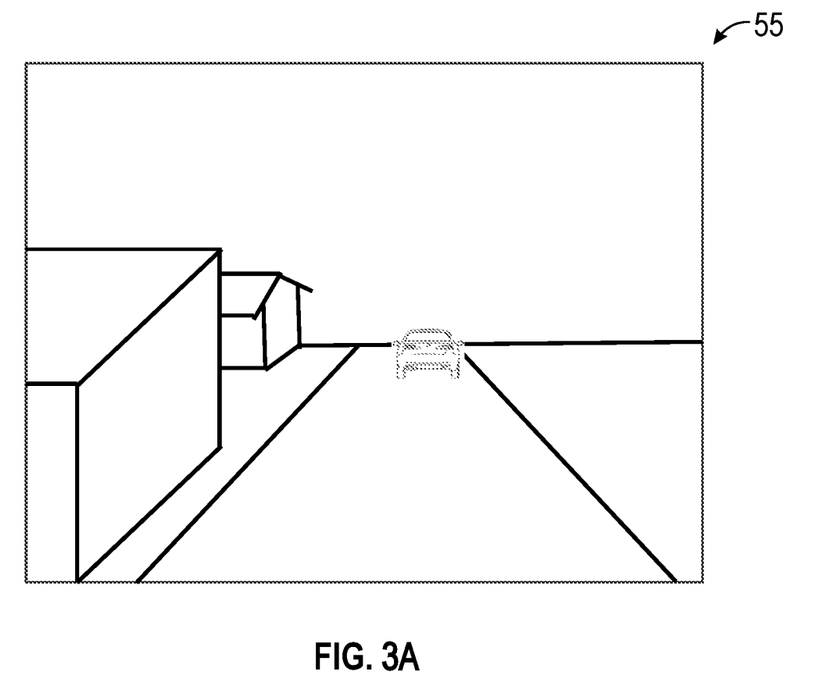
FIGS. 3A and 3B illustrate an exemplary dataset sample including at least one optical image and a plurality of corresponding light detection and ranging (LIDAR) measurements.
Figure 3B:
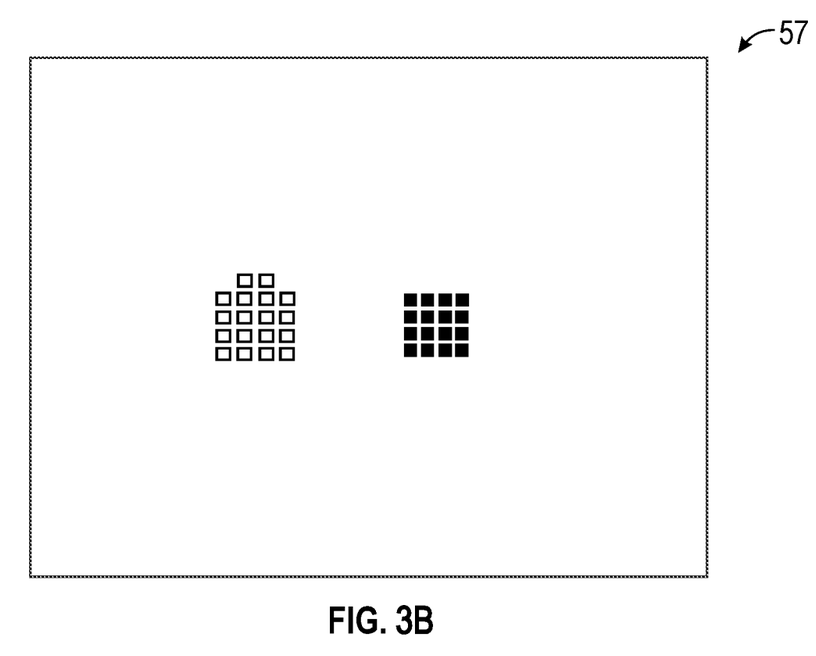

By providing aligned data, the parts of the scans from the distance sensor 32 that were in the direction that the optical sensor 30 was observing, for a group of the pixels in the image corresponding to the area in which depth data was gathered, the process may provide depth information. However, the data may hold sparse depth information due to the limitation in scans by the distance sensor 32. The dataset represented in external image 55 in FIG. 3A and distance scan 57 in FIG. 3B are smaller than the eye-gaze datasets. In one example, the depth dataset contains approximately 10,000 images and depth scans. 9,000 of those may be defined as a training set and another 1,000 examples may be defined as a validation set.

Figure 4A:
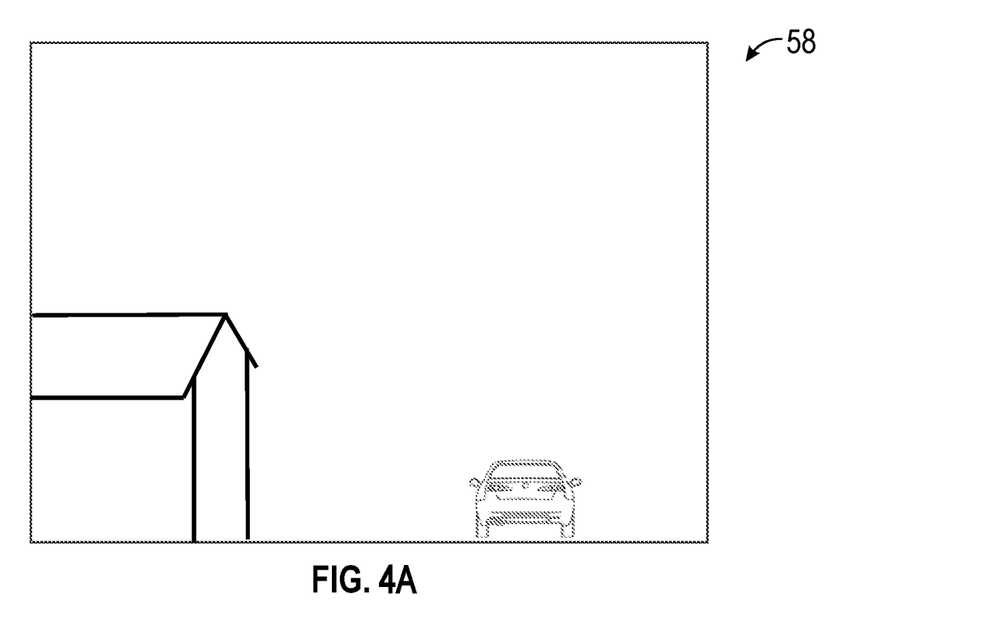
FIGS. 4A, 4B, and 4C illustrate similarity between gaze prediction and depth estimation through illustration of an original image (FIG. 4A), gaze prediction (FIG. 4B), and normalized disparity of ground truth (GT) (FIG. 4C).
Figure 4B:
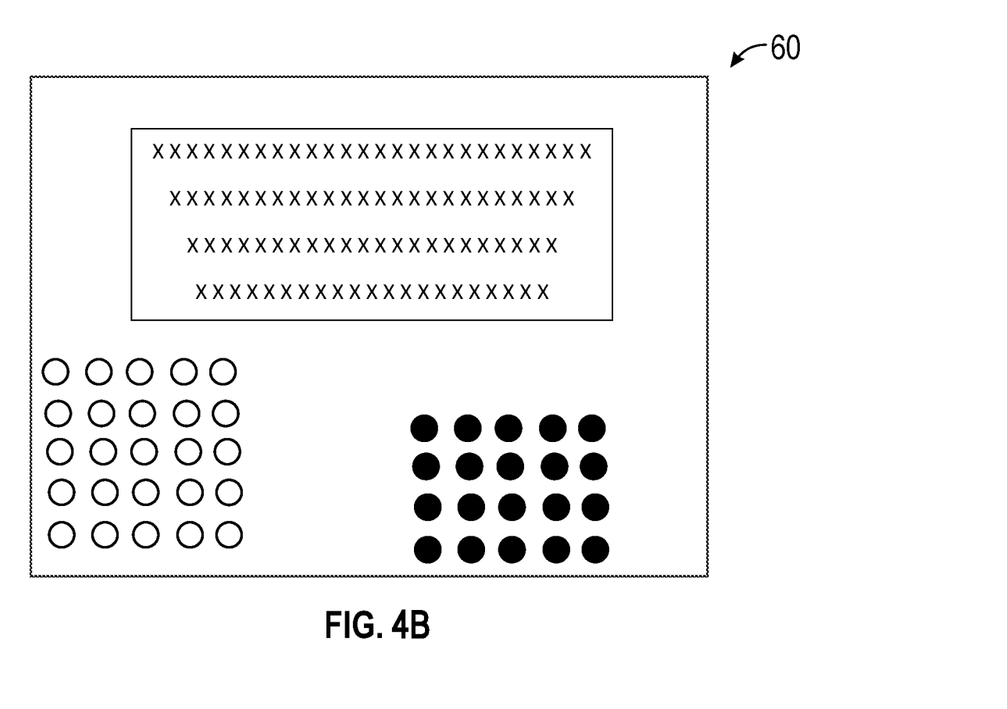
Figure 4C:
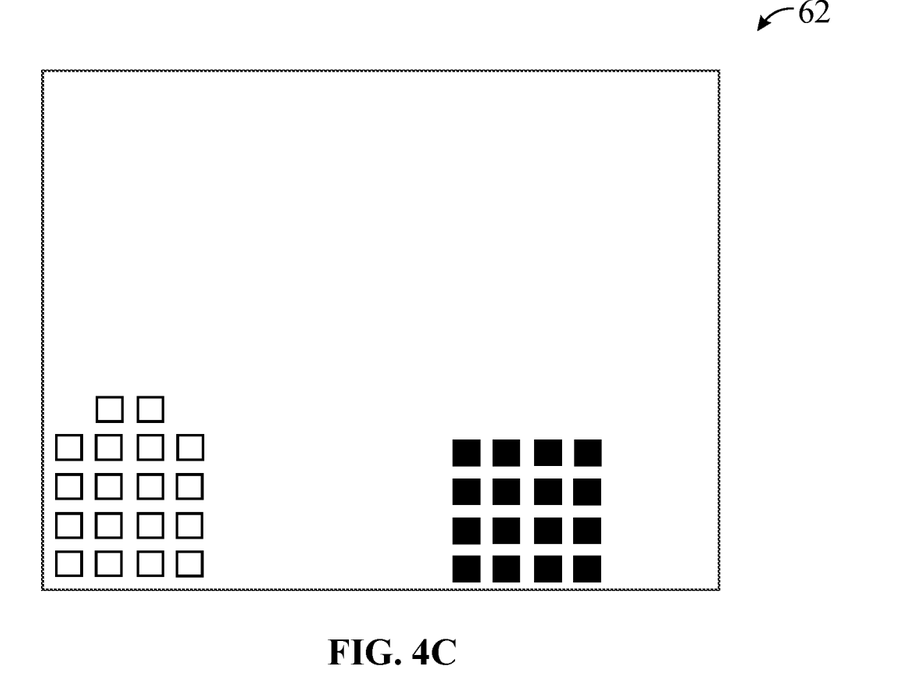

As shown in FIG. 4C, the normalized disparity or depth map 62 includes solid squares to indicate areas closest to the distance sensor 32, empty squares to identify an additional distance further away, and blank space where no data was collected such that depth information is unavailable for most pixels. This is in contrast to the eye-gaze image 50 which described each pixel in the eye-gaze image 50 as either including an eye gaze or not.

The depth dataset on the other hand is sparse. The majority of the pixels do not hold depth readings. One feature of this disclosure is to overcome this fundamental mismatch. On one hand, the eye gaze information is dichotomic in its nature. Each reading holds a single bit (driver was looking, not). On the other hand, depth information is continuous. It spans from zero to infinity.

One feature of this disclosure is to overcome span in depth information by making it more dichotomic, such as making the differentiation between close and far rather than zero to infinity.

The depth dataset is transformed to a variation of disparity to generate a normalized disparity at Block 128. In one example, normalized disparity is proportional to the inverse of the depth such that disparity$\propto$1/depth. Using 1/depth causes high depth values to converge around a single value. They are located at the positive vicinity of zero. In addition, one may define a minimal depth (denoted minDepth or mid) to act as a lower depth bound. One may define a close range on which high depth values are squeezed, non-linearly, to an area around zero. This can create a continuous version of the {close, far} dichotomy that might be similar in nature to the {looking, not looking} dichotomy. This similarity is demonstrated in 4A, 4B, and 4C.

FIGS. 4A, 4B, and 4C describe similarity between gaze prediction and depth estimation through illustration of an original image 58 (FIG. 4A), gaze prediction image 60 (FIG. 4B), and normalized disparity 62 of GT (FIG. 4C). In support of FIGS. 4A, 4B, and 4C, one may make an additional definition and present the last stage of the transformation and define maxDepth or mad.

At the last stage of the transformation, one may adapt to the dynamical range of neurons of the output layer of the pre-trained network. One may map it to the range from minNormDisparity or mind to maxNormDisparity or mand. In one example, [−2.5,2.5]), one may utilize the following equation.

$$pd = \frac{1/d - 1/mad}{1/mid - 1/mad} \quad (1)$$

$$nd = mind + pd(mand - mind) \quad (2)$$

where d, nd and pd are the measured depth, normalized disparity, and partial disparity, respectively.

The similarity between the {close, far} dichotomy and the {looking, not looking} dichotomy is shown in 4A, 4B, and 4C. In the original image captured by the external camera (FIG. 4), a vehicle is located at the lower right corner of the image 58. Identification of this object is beneficial from an automotive perspective.

The eye gaze prediction for this external image 58 is shown in FIG. 4B. Solid circles and X marks represent areas more and less likely (respectively) to be looked at by the driver, while empty circles identify areas that are in the middle of the likelihood spectrum. The vehicle in the lower right corner and its surroundings are highlighted by the gaze prediction network as an area with a higher likelihood of being observed by the driver.

The Ground Truth (GT) of the depth as measured by the distance sensor 32 is shown in FIG. 4C. Due to the sparseness of the depth information from the distance sensor 32, just a fraction of the pixels hold depth value. As in FIG. 3B, most of the solid squares are associated with the vehicle in the lower right corner of the external image 58. One may describe a similarity between the two maps illustrated in FIGS. 4B and 4C.

Because the loss is estimated sparsely, just the pixels from the GT/label 130 that have normalized disparity scores (Block 136) are used in a L1 score estimation (Block 138) by performing an L1 loss function (least absolute deviation) or another loss function. The output of the L1 loss can be back propagated through 140 to Block 134 for further refinement to minimize error which is the sum of the absolute differences between a ground truth value and a predicted value by the neural network. Once the error has been minimized to a desired level at Block 138, the normalized disparity estimation network is saved at Block 142.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of training a disparity estimation network, the method comprising:
   obtaining an eye-gaze dataset including a first plurality of images with at least one gaze direction associated with each of the first plurality of images;
   training a gaze prediction neural network based on the eye-gaze dataset to develop a model trained to provide a gaze prediction for an external image;
   obtaining a depth database including a second plurality of images having depth information associated with each of the second plurality of images, wherein the first plurality of images matches the second plurality of images.; and
   training a disparity estimation neural network for object detection based on an output from the gaze prediction neural network and an output from the depth database.

2. The method of claim 1, wherein the first plurality of images is captured by at least one optical sensor and the at least one gaze direction associated with each of the first plurality of images is captured by a gaze direction system configured to determine an eye gaze direction for at least one eye.

3. The method of claim 2, wherein the second plurality of images is captured by the at least one optical sensor and the depth information associated with each of the second plurality of image is captured by a distance sensor configured to determine a distance between an object and the distance sensor.

4. The method of claim 1, wherein training the gaze prediction neural network on the eye-gaze dataset includes performing a dilation on the at least one gaze direction.

5. The method of claim 4, wherein the dilation corresponds to an area of focus of an eye.

6. The method of claim 1, wherein training the gaze prediction neural network includes associating at least one eye gaze direction with a corresponding one of the first plurality of images.

7. The method of claim 1, wherein the output from the depth database includes transforming the depth information into normalized disparity maps according to normalized disparity label.

8. The method of claim 7, wherein the output from the depth database includes the second plurality of images.

9. The method of claim 8, wherein a resolution of the normalized disparity maps matches a scaled version of a corresponding one of the second plurality of images.

10. The method of claim 1, wherein training the disparity estimation neural network includes minimizing a least absolute deviation between a ground truth measurement and a prediction by the disparity estimation neural network.

11. The method of claim 10, including performing a back propagation when training the disparity estimation neural network to minimize the least absolute deviation.

12. A non-transitory computer-readable storage medium embodying programmed instructions which, when executed by a processor, are operable for performing a method comprising:
obtaining an eye-gaze dataset including a first plurality of images with at least one gaze direction associated with each of the first plurality of images;
training a gaze prediction neural network based on the eye-gaze dataset to develop a model trained to provide a gaze prediction for an external image, wherein training the gaze prediction neural network on the eye-gaze dataset includes performing a dilation on the at least one gaze direction.;
obtaining a depth database including a second plurality of images having depth information associated with each of the second plurality of images; and
training a disparity estimation neural network for object detection based on an output from the gaze prediction neural network and an output from the depth database.

13. The non-transitory computer-readable storage medium of claim 12, wherein the first plurality of images is captured by at least one optical sensor and the at least one gaze direction associated with each of the first plurality of images is captured by a gaze direction system configured to determine an eye gaze direction for at least one eye.

14. The non-transitory computer-readable storage medium of claim 13, wherein the second plurality of images is captured by the at least one optical sensor and the depth information associated with each of the second plurality of image is captured by a distance sensor configured to determine a distance between an object and the distance sensor.

15. The non-transitory computer-readable storage medium of claim 12, wherein training the gaze prediction neural network includes associating at least one eye gaze direction with a corresponding one of the first plurality of images.

16. The non-transitory computer-readable storage medium of claim 12, wherein the output from the depth database includes transforming the depth information into normalized disparity maps according to normalized disparity label.

17. The non-transitory computer-readable storage medium of claim 16, wherein the output from the depth database includes the second plurality of images.

18. A vehicle system, the system comprising:
at least one optical sensor configured to capture a plurality of images;
at least one distance sensor configured to measure a plurality of distances from the at least one distance sensor;
an eye gaze measurement system configured to determine an eye position of a driver; and
a controller in communication with the at least one optical sensor, the at least one distance sensor, and the eye gaze measurement system, wherein the controller is configured to:
obtain an eye-gaze dataset including a first plurality of images with at least one gaze direction associated with each of the first plurality of images;
train a gaze prediction neural network based on the eye-gaze dataset to develop a model trained to provide a gaze prediction for an external image;
obtain a depth database including a second plurality of images having depth information associated with each of the second plurality of images; and
train a disparity estimation neural network for object detection based on an output from the gaze prediction neural network and an output from the depth database, wherein training the disparity estimation neural network includes minimizing a least absolute deviation between a ground truth measurement and a prediction by the disparity estimation neural network.

19. The vehicle system of claim 18, wherein the first plurality of images matches the second plurality of images.

20. The non-transitory computer-readable storage medium of claim 12, wherein the first plurality of images matches the second plurality of images.

* * * * *